United States Patent [19]

Braun et al.

[11] Patent Number: 5,318,367

[45] Date of Patent: Jun. 7, 1994

[54] PIVOTABLE KEYBOARD ARRANGEMENT

[75] Inventors: Franz Braun, Tuttlingen; Heinz Hoffmann, Spaichingen, both of Fed. Rep. of Germany

[73] Assignee: Marquardt Switches, Inc., Cazenovia, N.Y.

[21] Appl. No.: 935,442

[22] Filed: Aug. 26, 1992

[51] Int. Cl.$^5$ ............................................. B41J 5/10
[52] U.S. Cl. .................................. 400/82; 400/489; 400/488
[58] Field of Search ............... 400/82, 472, 477, 485, 400/486, 488, 489, 682

[56] References Cited

U.S. PATENT DOCUMENTS

| | | | |
|---|---|---|---|
| 3,940,758 | 2/1976 | Margolin | 400/682 |
| 3,990,565 | 11/1976 | Felton et al. | 400/682 |
| 4,378,553 | 3/1983 | McCall | 400/82 |
| 4,483,634 | 11/1984 | Frey et al. | 400/489 |
| 4,509,873 | 4/1985 | Ryan | 400/682 |
| 4,564,751 | 1/1986 | Alley et al. | 364/708 |
| 4,597,681 | 7/1986 | Hodges | 400/492 |
| 4,661,005 | 4/1987 | Lahr | 400/82 |
| 5,067,834 | 11/1991 | Szmanda et al. | 400/82 |
| 5,156,475 | 10/1992 | Zilberman | 400/472 |

FOREIGN PATENT DOCUMENTS

| | | |
|---|---|---|
| 0055220 | 6/1982 | European Pat. Off. . |
| 577708 | 6/1933 | Fed. Rep. of Germany . |
| 1255117 | 6/1968 | Fed. Rep. of Germany . |
| 2218065 | 10/1973 | Fed. Rep. of Germany . |
| 3629417 | 3/1988 | Fed. Rep. of Germany . |
| 8714596.0 | 4/1988 | Fed. Rep. of Germany . |
| 8801303 | 6/1988 | Fed. Rep. of Germany . |
| 8716224.5 | 8/1988 | Fed. Rep. of Germany . |
| 3707049 | 11/1988 | Fed. Rep. of Germany . |
| WO85/03035 | 7/1985 | PCT Int'l Appl. ............. 400/82 |
| 1518144 | 10/1989 | U.S.S.R. . |
| 2172852 | 10/1986 | United Kingdom . |
| 020620 | 9/1991 | World Int. Prop. O. . |

OTHER PUBLICATIONS

IBM Technical Disclosure Bulletin, vol. 25, No. 9, Feb. 1983, Kana Keyboard with Palm Rest, A. Uchiyama.
"Die ergonomische Tastatur. Konsequent in Richtung Zukunft gedacht"; (Marquardt); [Ergonomic Keyboard. Responsibly Conceived towards the Future]; 1987.
"Ergonomische Tastaturgestaltung"; (Fraunhofer-Institut); [Ergonomic Keyboard Configuration].
"Report"; (STR), Technische Zeitschrift der Standard Telephon und Radio AG, vol. 7, No. 1, Jun. 1986.
"The Boswell System"; (2 Seiten); Oct. 12th, 1991.
"Schöne Grüsse vom Computer"; (Elektronic Praxis) [Best regards from the Computer]; Jan. 23rd, 1992.
German Geschmacksmuster (Design Bulletin), Issue 1, Jan. 10, 1992, pp. 194, 324.

Primary Examiner—David A. Wiecking
Attorney, Agent, or Firm—Spencer, Frank & Schneider

[57] ABSTRACT

A keyboard arrangement and particularly an ergonomic keyboard arrangement is provided which includes, in particular, keyboard blocks (5, 6) that are arranged in the shape of a V for ergonomic operation.

In order to be able to vary the V-shaped arrangement of the keyboard blocks (5, 6), one or a plurality of hinges (14, 15) are provided. Moreover, in order to accommodate the keyboard blocks (5, 6), the keyboard housings (2, 3) can be displaced laterally by means of long holes that are arranged in a transverse web in the upper region of the housing so as to vary the distance between the keyboard blocks (5, 6).

11 Claims, 3 Drawing Sheets

PIVOTABLE KEYBOARD ARRANGEMENT

BACKGROUND OF THE INVENTION

The invention relates to a keyboard arrangement and particularly to an ergonomic typing keyboard composed of at least two spatially separated keyboard blocks each arranged in a keyboard housing and each operable by one hand of an operator.

PRIOR ART

A conventional typing keyboard for a typewriter or for operating a word-processing computer has a field of keys for common use by the operator's left and right hands, with a plurality of horizontal rows lying one above the other.

In recent years, so-called ergonomic keyboards have become known in which blocks of keys are provided separately for the left and right hand of the operator, with the key blocks being arranged in a V-shaped angle that opens toward the operator (German Unexamined Published Patent Application DE-OS 2,218,065). According to German Published Patent Application DE-AS 1,255,117, the keys may additionally be arranged three-dimensionally in space. A similar keyboard is disclosed in German Patent 577,708.

Thus the significant change in ergonomic keyboards compared to the classic keyboard shape is that the key field is subjected to three-dimensional expansion. Moreover, the V-shaped arrangement of the two keyboard blocks for the left and right hand is a characteristic feature. Due to the division of the alphanumeric key field and the V-shaped arrangement, each hand is able to remain in its normal position and need not be placed at a sideways angle. This leads to a reduction in static stress. In order to additionally counteract an inward rotation of the hand, the keyboard may also be provided with an additional lateral inclination of the key fields.

The drawback of the prior art ergonomic keyboards is that the arrangement of the key fields is fixed in principle. Depending on the manufacturer, the V-shaped angled arrangement and the arrangement of the keyboard blocks per se is predetermined and fixed.

U.S. Pat. No. 4,378,553 discloses a keyboard arrangement with separate keyboard blocks for the operator's left and right hand. In order to realize a more flexible arrangement of the keyboard blocks, they may be laterally displaced in a type of slide guide on a supporting frame. In this way, it is possible to vary the distance between the keyboard blocks and adapt it to requirements. Such an arrangement cannot easily be realized in a conventional or even an ergonomic typing keyboard because the latter are generally of a very flat construction and it is not possible to provide an additional supporting structure as the adjustment device.

SUMMARY AND ADVANTAGES OF THE INVENTION

In contrast to the prior art keyboards, the keyboard according to the invention has the advantage that it offers a very universal adjustability for the individual keyboard blocks. In principle, both keyboard blocks for the operator's left and right hand are each arranged in a housing, with the sides of the housing contacting one another and thus forming a unit. In their upper region, the respective housings are connected with one another by way of at least one hinge so that the adjacent housings can be pivoted apart to form the V-shaped opening angle. For example, an entirely conventional keyboard having initially parallel rows of keys may be separated in the middle. By way of an upper hinge the keyboard blocks can then be pivoted into the desired V-shaped position.

As a further feature of the invention it is provided that two hinge points are provided in the upper region of the two keyboard housings for pivoting the keyboard blocks, with a long hole guide or a slide guide permitting the distance between the keyboard blocks to be varied. The connection between the housings is effected by way of a web having a corresponding long hole configuration.

According to the invention it is a further advantage if a further narrow housing to accommodate keyboard blocks carrying special symbols is provided between the two housings for the keyboard blocks. This narrow special keyboard block together with the upper connecting web for the two housings accommodating the typing keyboard blocks forms the shape of the letter T.

BRIEF DESCRIPTION OF THE DRAWINGS

Further details and advantages of the invention are defined in the description below of embodiments thereof that are illustrated in the drawing figures, in which.

DESCRIPTION OF THE EMBODIMENTS

Figure 1:
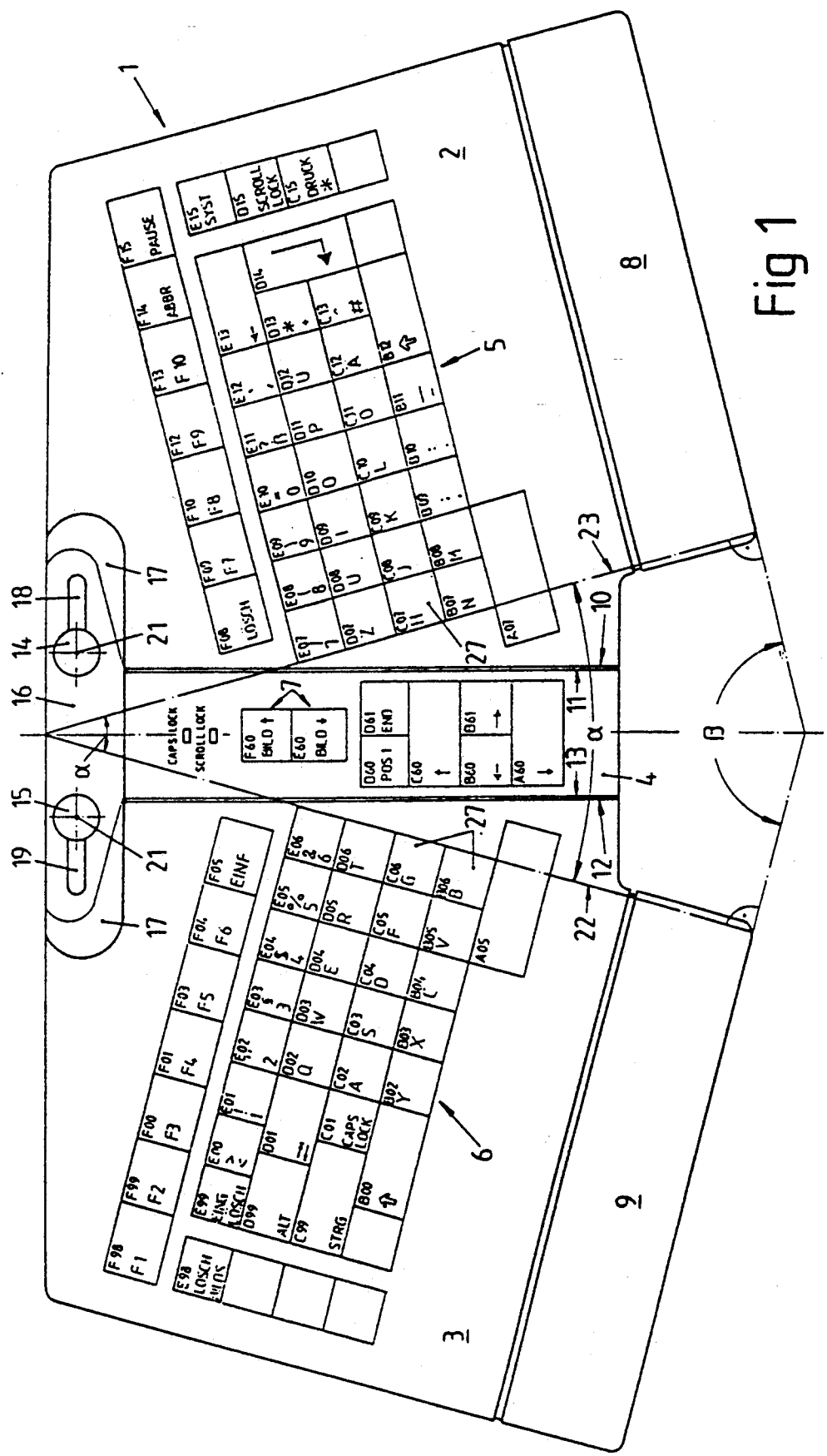
FIG. 1 is a top view of an ergonomic keyboard composed of three blocks of keys.
Figure 2:
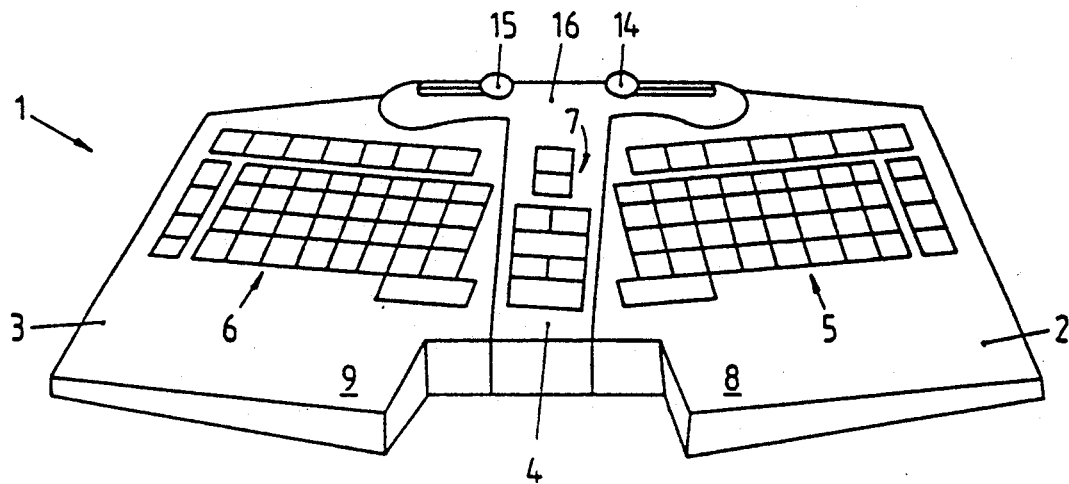
FIG. 2 is a perspective view of the keyboard of FIG. 1.
Figure 3:
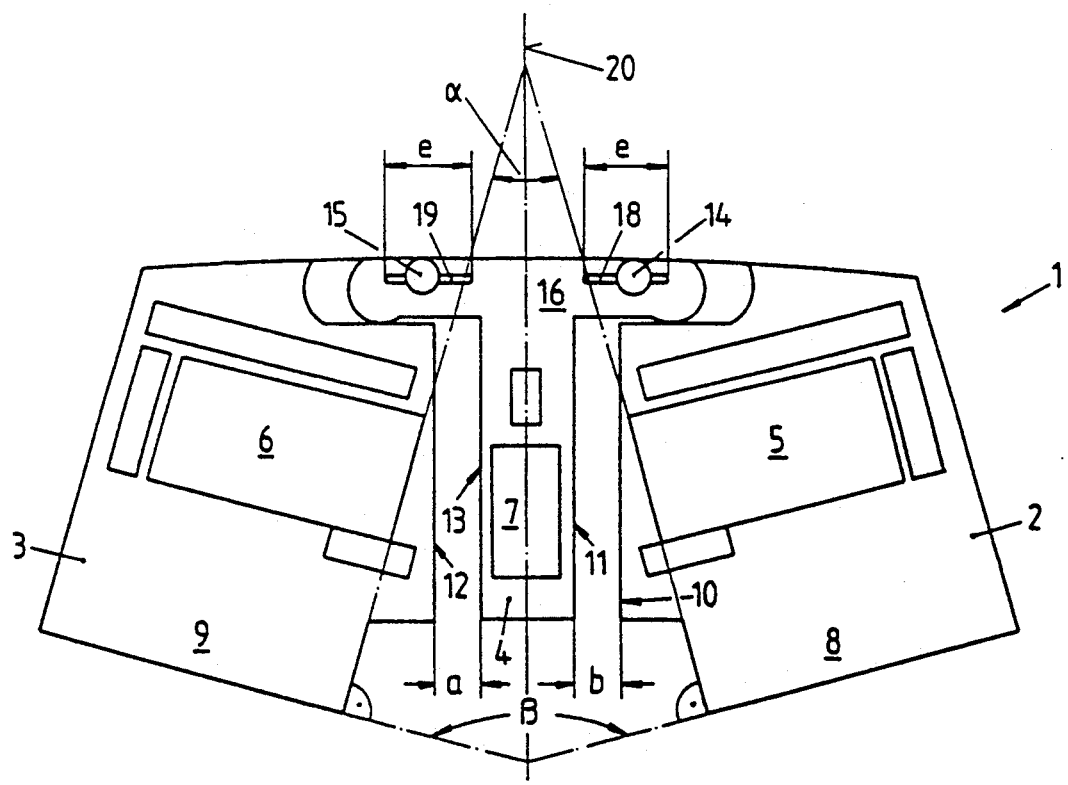
FIG. 3 shows a keyboard according to FIG. 1 that has been pulled apart to the sides.

FIGS. 1 to 4 are various views of the same ergonomic keyboard arrangement 1 in different positions. As shown in the top view of FIG. 1 and in the perspective view of FIG. 2, the keyboard arrangement 1 is composed of a right keyboard housing 2 including a keyboard block 5 for the operator's right hand and a left keyboard housing 3 including a keyboard block 6 for the operator's left hand. Between the two keyboard housings 2 and 3, there is disposed a further narrow keyboard housing 4 including a keyboard block 7 for special symbols such as, for example, the cursor keys. Keyboard blocks 5 and 6 are provided with the customary alphanumeric keys as they are known for conventional typing keyboards. Corresponding to the configuration as an ergonomic keyboard, keyboard blocks 5 and 6 for the operator's right and left hands are arranged at an angle $\alpha \approx 20°$ to $40°$ and particularly $\alpha \approx 30°$ which opens toward the operator. The angle $\alpha$ is defined by tangents 22 and 23 at individual keys 27. FIGS. 1 and 3 additionally show an angle $\beta$ which faces away from the operator; it is expressed mathematically as follows: $\beta = 180° - \alpha$.

The angular arrangement of the keyboard blocks corresponds to an arrangement known in ergonomic keyboards that are intended to accommodate the normal and ergonomically correct position of the arms and hands of the operator. For this purpose, wrist rests 8 and 9 facing the operator are provided at keyboard housings 2 and 3.

In the illustration of the keyboard arrangement according to FIGS. 1 and 2, keyboard housings 2 and 4 are pushed together in such a way that the adjacent side walls 10 to 13 of keyboard housings 2 to 4 contact one another. In such a position of the keyboard housings 2 and 4 the side walls 10 to 13 are parallel to one another and the angle $\alpha$ is at its minimum. In the operative arrangement this corresponds to the generally known keyboard shape.

In order to make the arrangement of keyboard blocks 5 and 6 variable, the keyboard arrangement according to the invention is provided in several parts, particularly in three parts, to include keyboard housings 2 to 4. In a special embodiment, however, the middle keyboard housing 4 may be omitted so that the side faces 10 and 12 of the two housing components 2 and 3 are directly adjacent to one another.

As shown in FIGS. 1 to 4, the two keyboard housings 2 and 3 are connected with one another in their upper, facing corner regions 25 by way of two hinges (hinge pins) 14 and 15 and a transverse web 16 that connects the hinges. The flat transverse web 16 lies in a flat recess 17 in the upper region of each one of keyboard housings 2 and 3 and includes two transverse long holes 18 and 19 which serve as slide guides for the hinge pins 14, 15 passing therethrough. Transverse web 16 is made of one piece with intermediate housing 4 and forms a generally T-shaped member between keyboard housings 2 and 3.

According to the illustration of the invention in FIG. 3, keyboard housings 2 to 4 may, on the one hand, be pulled apart laterally so that, for example in an unchanged symmetrical arrangement with respect to symmetry axis 20, the same distances a and b result between side faces 10 to 13 (see FIG. 3). The angle $\alpha$ remains unchanged here, that is, side faces 10 to 13 lie parallel to one another.

Pulling apart the two keyboard housings 2 and 3, and thus keyboard blocks 5 and 6, is thus effected by displacing hinges 14 and 15 in long holes 18 and 19. The length e of long holes 18 and 19 determines the maximum lateral displacement path.

Figure 4:
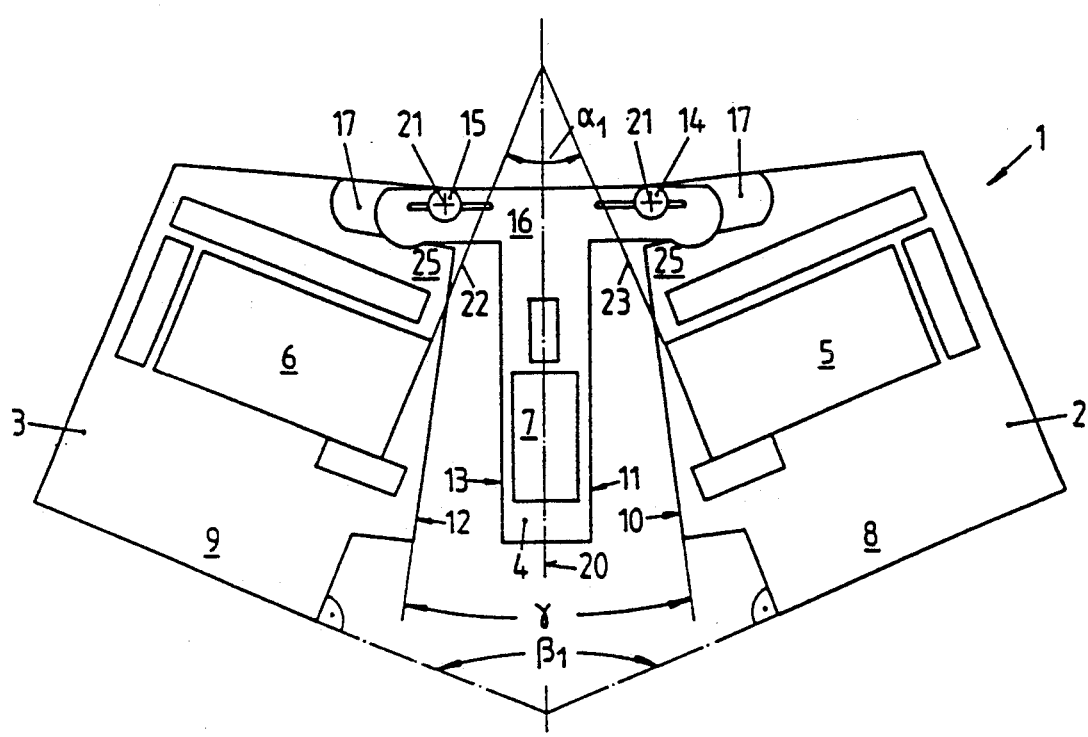
FIG. 4 shows a keyboard according to FIG. 1 that has been pulled apart to the sides and is pivoted into the open position.

As additionally shown in FIG. 4, keyboard housings 2 and 3, in addition to the lateral displacement described in connection with FIG. 3, can also be pivoted about the vertical pivot axis 21 of hinges 14 and 15 in order to change the angle $\alpha$ and thus the angle $\beta$. In the illustration of FIG. 4, side faces 10 to 13 are therefore no longer parallel but are arranged at an opening angle to one another so that $\alpha_1$ in FIG. 4 is greater than $\alpha$ in FIGS. 1 and 3. The enlargement of angle $\alpha_1$ causes angle $\beta_1$ to be decreased correspondingly. Likewise, the side edges 10 and 12 which were initially parallel to the axis of symmetry 20 now enclose an opening angle $\gamma$.

Due to the provision of hinges 14 and 15, keyboard housings 2 and 3 can be pivoted outwardly or also inwardly as desired in order to change the angle $\alpha_1$ in order to attain any desired angular position for keyboard blocks 5. Insofar as the keyboard blocks are pushed outwardly relative to the illustration in FIGS. 1 and 2 by way of long holes 18 and 19, the angle $\alpha$ can also be made smaller so that, in the extreme case, the angular arrangement of the keyboard blocks is cancelled out and the blocks form parallel rows.

Figure 5:
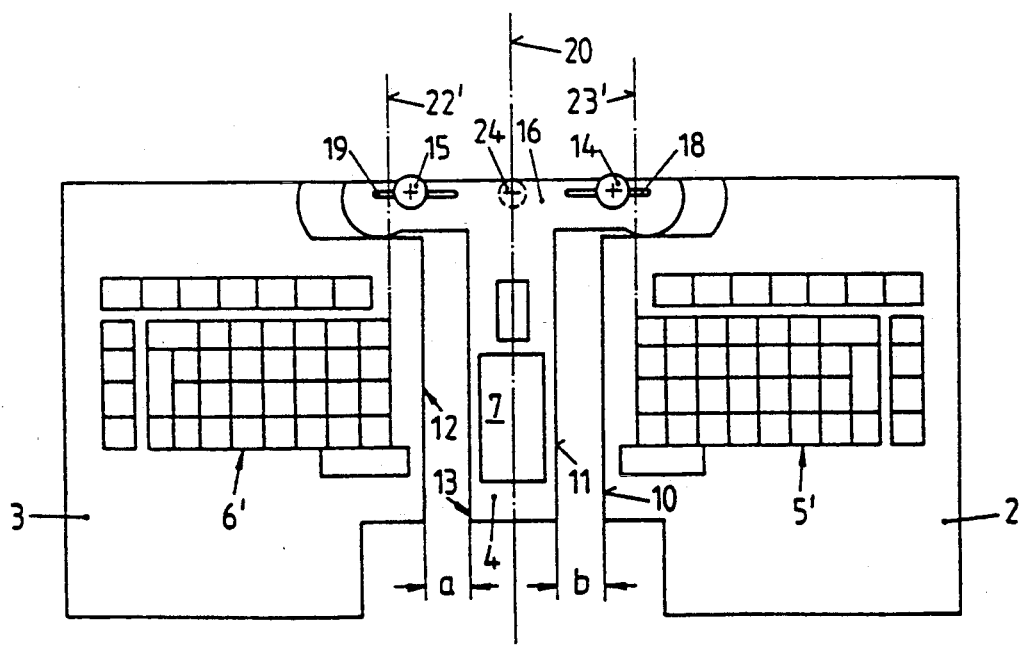
FIG. 5 shows a variation of the embodiment in which the rows of keys are parallel in the starting position.

In the embodiment of the invention shown in FIG. 5, keyboard blocks 5' and 6' are employed which in their starting position are arranged in parallel rows, that is, the angular arrangement $\alpha$, $\alpha_1$ formed in FIGS. 1 to 4 and including angle radians 22 and 23 and the key tangents is initially cancelled out. The key tangents 22' and 23' initially are parallel to one another. This corresponds to the normal arrangement of a typing keyboard.

By way of hinge points 14 and 15, keyboard housings 2 and 3 can now again be pivoted outwardly so that an angular and particularly a V-shaped arrangement results for the initially linear keyboard blocks 5' and 6'. Key tangents 22' and 23' then also enclose an angle $\alpha$. In this way, a so-called ergonomic keyboard in which the keyboard blocks 5 and 6 or 5' and 6', respectively, are arranged in the shape of a V can be produced from any "normal" keyboard. The same applies for the lateral displaceability of keyboard housings 2 and 3 in long holes 18 and 19 in order to vary the distances a and b between side faces 10 to 13.

In the embodiments of the invention shown in FIGS. 1 to 5, the middle "T member" composed of the upper flat transverse web 16 and the attached keyboard housing 4 remains unchanged in principle in its respective position. However, keyboard housing 4 as a whole may be omitted so that the two keyboard housings 2 and 3 are immediately adjacent to one another. In that case, for example, only one hinge 24 may be provided which is arranged on the axis of symmetry 20 as shown in dashed lines in FIG. 5. If only one hinge 24 is provided, keyboard housings 2 and 3 can be pivoted only within their pivot angle $\alpha$. Lateral spreading is not possible in this case. It would require two hinges 14 and 15 and an associated transverse web 16.

The arrangement according to the invention has the advantage that a very variable keyboard block arrangement can be created with a conventional keyboard arrangement (FIG. 5) or with an ergonomic keyboard arrangement (FIGS. 1 to 4). In particular, the opening angle $\alpha$ of keyboard blocks 5 and 6 can be varied and adapted to the operator's requirements. The same applies for changing the distance between keyboard blocks 5 and 6 by displacing the keyboard housings in long holes 18 and 19. For example, for a very large and broad-shouldered operator, a position is selected in which the keyboard blocks are farther apart and arranged at a larger angle $\alpha_1$.

The invention is not limited to the illustrated and described embodiments. Rather it also includes all arrangements by a person skilled in the art and all modifications within the scope of the inventive concept.

We claim:

1. A keyboard comprising:
   (a) first and second keyboard housings situated adjacent one another and having respective upper corners facing each other;
   (b) first and second keyboard blocks accommodated in said first and second keyboard housings, respectively; said first and second keyboard blocks being operable by different hands of an operator;
   (c) first and second hinge pins affixed to said first and second keyboard housings in the respective upper corner thereof; each said hinge pin having a pivot axis; and
   (d) a transverse web having first and second elongated holes; said first and second hinge pins extending into said first and second elongated holes, respectively, to provide for a sliding movement of said first and second hinge pins in and along said first and second elongated holes, respectively, for changes a distance of the keyboard housings from one another and to provide for an angular displacement of said first and second keyboard housings toward or away from one another about the pivot axis of said first and second hinge pins for changing an angular position of said keyboard housings relative to one another.

2. The keyboard as defined in claim 1, wherein said first keyboard housing has a first side face and said second keyboard housing has a second side face; said first and second side faces being oriented towards one another; said first and second side faces extending parallel to one another if an angle of said angular position assumes a minimum value.

3. The keyboard as defined in claim 1, wherein said first and second keyboard blocks are inclined downwardly towards a normally positioned operator and further wherein said first and second keyboard blocks are inclined downwardly in a direction away from one another.

4. The keyboard as defined in claim 1, further wherein each said keyboard housing includes a wrist rest.

5. The keyboard as defined in claim 1, further wherein each said keyboard housing includes a longitudinal guide slidably receiving said transverse web.

6. The keyboard as defined in claim 1, wherein said first and second keyboard blocks each have parallel key rows; each key rows of said first keyboard block and said second key rows of said second keyboard block being parallel to one another if an angle of said angular position assumes a minimum value.

7. The keyboard as defined in claim 6, wherein said first and second keyboard blocks have alphanumeric keys.

8. The keyboard as defined in claim 1, further comprising a third keyboard housing accommodating a third keyboard block; said third keyboard housing being situated between said first and second keyboard housings and forming a one-piece component with said transverse web; said one-piece component being T-shaped.

9. The keyboard as defined in claim 8, wherein said first keyboard housing has a first side face; said second keyboard housing has a second side face and said third keyboard housing has opposite third and fourth side faces; said first side face being in a face-to-face engagement with said third side face and said second side face being in a face-to-face engagement with said fourth side face if an angle of said angular position assumes a minimum value.

10. The keyboard as defined in claim 1, wherein said first and second keyboard blocks are inclined to one another if an angle of said angular position assumes a minimum value.

11. The keyboard as defined in claim 10, wherein said first and second keyboard blocks have alphanumeric keys.

* * * * *